United States Patent
Wang et al.

(10) Patent No.: US 9,403,152 B2
(45) Date of Patent: Aug. 2, 2016

(54) CATALYST MATERIALS USEFUL FOR SOUR GAS SHIFT REACTIONS AND METHODS FOR USING THEM

(71) Applicant: Clariant Corporation, Louisville, KY (US)

(72) Inventors: Justin X. Wang, Louisville, KY (US); William M. Faris, Louisville, KY (US); Yeping Cai, Louisville, KY (US)

(73) Assignee: CLARIANT CORPORATION, Louisville, KY (US)

( * ) Notice: Subject to any disclaimer, the term of this patent is extended or adjusted under 35 U.S.C. 154(b) by 0 days.

(21) Appl. No.: 14/088,526

(22) Filed: Nov. 25, 2013

(65) Prior Publication Data

US 2015/0148221 A1    May 28, 2015

(51) Int. Cl.
*B01J 23/24* (2006.01)
*B01J 23/887* (2006.01)
*B01J 23/28* (2006.01)
*B01J 23/30* (2006.01)
*C01B 3/16* (2006.01)

(52) U.S. Cl.
CPC .............. *B01J 23/8872* (2013.01); *B01J 23/28* (2013.01); *B01J 23/30* (2013.01); *C01B 3/16* (2013.01)

(58) Field of Classification Search
CPC ............. B01J 23/24; B01J 23/28; B01J 23/30
USPC ......................................... 502/305, 306, 307
See application file for complete search history.

(56) References Cited

U.S. PATENT DOCUMENTS

| 2,784,162 | A | * | 3/1957 | Myers et al. .................. 502/227 |
| 6,019,954 | A | | 2/2000 | Tang |
| 8,846,564 | B2 | | 9/2014 | Wang |
| 2010/0081567 | A1 | * | 4/2010 | Wang et al. ..................... 502/74 |
| 2014/0138586 | A1 | * | 5/2014 | Meese-Marktscheffel et al. ............................. 252/373 |
| 2014/0158942 | A1 | | 6/2014 | Abbott |

FOREIGN PATENT DOCUMENTS

WO    WO 2012171933 A1 * 12/2012

* cited by examiner

Primary Examiner — Matthew E Hoban
Assistant Examiner — James Fiorito

(57) ABSTRACT

The disclosure provides molybdenum and/or tungsten containing catalyst materials useful for the sour gas shift reactions and methods for using such catalyst materials, for example, for converting carbon monoxide and steam to carbon dioxide and hydrogen.

18 Claims, 5 Drawing Sheets

Catalyst materials: (1) 4.6 wt% $MoO_3/Al_2O_3$
(2) 4.6 wt% $MoO_3/Al_2O_3$-$MgAl_2O_4$ (55:45)
Conditions:
(a) SV = 3000/h, 200 psi, S/G = 1.0
(b) SV = 3000/h, 400 psi, S/G = 1.0
(c) SV = 1500/h, 400 psi, S/G = 1.0
(d) SV = 1500/h, 400 psi, S/G = 0.45
(e) SV = 1500/h, 200 psi, S/G = 1.0

CATALYST MATERIALS USEFUL FOR SOUR GAS SHIFT REACTIONS AND METHODS FOR USING THEM

BACKGROUND OF THE INVENTION

1. Field of the Invention

The disclosure provides molybdenum and/or tungsten-containing catalyst materials useful for the sour gas shift reactions and methods for using such catalyst materials.

2. Description of Related Art

Synthesis gas, also termed syngas, comprising hydrogen and carbon oxides (CO and $CO_2$) is an important feedstock in the chemical and energy industries. It may be generated by gasification of carbonaceous feedstocks such as coal, petroleum coke or other carbon-rich feedstocks using oxygen or air and steam at elevated temperature and pressure. Gasification can provide an undesirably high ratio of CO to $H_2$. To remedy this, the water-gas shift reaction:

$$H_2O + CO \rightarrow H_2 + CO_2$$

can be used to consume CO and form $H_2$. Specialized catalysts, such as copper-based catalysts, iron-based catalysts and nickel-based catalysts, are typically used in the water gas shift reaction. However, when the synthesis gas contains one or more sulfur compounds, such catalysts can become inactivated. Accordingly, sulfur-tolerant shift catalysts have been developed, based on, for example, cobalt-molybdenum catalyst compounds. When the water-gas shift reaction is performed in the presence of sulfur impurities, it is known as a "sour gas shift". Sour gas shift reactions are generally exothermic, and are conventionally allowed to run adiabatically, with control of the exit temperature governed by feed gas inlet temperature and composition. With an increase in temperature, however, undesirable side reactions can occur, particularly methanation. Moreover, unsafe reaction conditions and the possibility of catastrophic reaction runaway increase with increasing temperature. The problem of exothermicity is especially important in cases where the inlet gas stream has a high CO concentration. But more and more technologies used for gasification generate high CO concentration (over 60%), well over the 40% CO concentration at which typical industrial sour gas shift reactions run manageably and safely. To avoid side reactions and unsafe operation, the shift reaction is typically performed with considerable amounts of added steam. However, such steam addition can complicate reaction processes, and the costs of generating steam can be considerable.

SUMMARY OF THE INVENTION

In one aspect, the present invention provides a catalyst material including a carrier material; and a catalytically-active molybdenum compound, a catalytically-active tungsten compound, or a combination thereof, disposed on the carrier material, present in the range of about 1 weight % to about 10 weight % based on the total weight of the catalyst material, calculated as $MoO_3$ or $WO_3$.

In another aspect, the present invention provides a catalyst material consisting essentially of molybdenum oxide present in the range of about 3 weight % to about 7 weight %, and a carrier material present in the range of about 93 weight % to about 97 weight %.

In another aspect, the present invention provides a catalyst material consisting essentially of molybdenum oxide present in the range of about 3 weight % to about 7 weight %, cobalt oxide present in an amount up to about 1.0 weight %, and a carrier material present in the range of about 93 weight % to about 97 weight %.

In another aspect, the present invention provides a method for converting carbon monoxide and steam to carbon dioxide and hydrogen, the method comprising reacting a carbon monoxide-containing feed gas with steam in contact with a catalyst material as described herein.

In another aspect, the present invention provides a method for converting carbon monoxide and steam to carbon dioxide and hydrogen, the method including sulfiding a catalyst material as described herein to provide a sulfided catalyst material; and reacting a carbon monoxide-containing feed gas with steam in contact with the sulfided catalyst material.

DETAILED DESCRIPTION OF THE INVENTION

Figure 1:
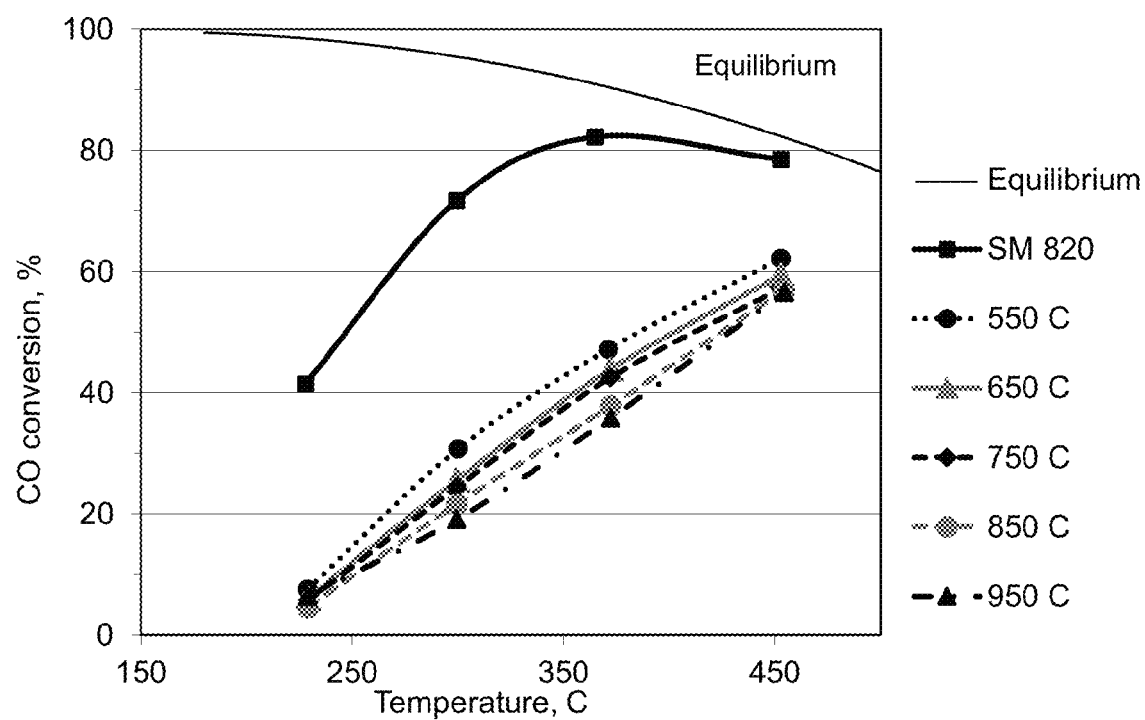
FIG. 1 is a graph depicting the results of an investigation of the effect of thermal treatment of the aluminum oxide carrier material on catalytic activity.

Before the disclosed methods and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein the term "contacting" includes the physical contact of at least one substance to another substance.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the shift catalyst). All mol % values are based on the moles of metal atoms.

In view of the present disclosure, the methods and active materials described herein can be configured by the person of ordinary skill in the art to meet the desired need. In general, the disclosed materials, methods, and apparati provide improvements in supports or carriers utilized in the production and use of synthesis gas and in other gasification-related technologies, particularly in the sour gas shift process. For example, in certain aspects, the catalysts of the disclosure are less reactive than commercial materials, have low methanation activity, high thermal stability and/or low production cost. In certain aspects, the catalysts of the disclosure are highly stable and insensitive to changes in temperature, steam/gas ratio, and space velocity.

One embodiment is a catalyst material. The catalyst material can be useful, for example, as a catalyst for use in a sour gas shift reaction, as described in more detail below. The catalyst material includes a carrier material. The catalyst material also includes, disposed on the carrier material, catalytically-active molybdenum compound, a catalytically-active tungsten compound, or a combination thereof, present at about 1 weight % to about 9 weight % based on the total weight of the catalyst material, calculated as oxide. As described in more detail herein, such catalyst materials can be made with relatively low activity, and as such can be used in sour gas shift processes with high levels of CO in the input stream without causing undue increases in process temperature. Accordingly, in certain aspects, processes using the catalysts described herein can enjoy the advantages of relatively low levels of methanation side reaction and/or increased catalyst lifetime.

The catalytically-active molybdenum compound, catalytically-active tungsten compound, or the combination thereof can be present, for example, in a range of about 2 weight % to about 8 weight %, calculated as oxide. In other embodiments, the catalytically-active molybdenum compound, catalytically-active tungsten compound, or the combination thereof can be present in a range of about 3 weight % to about 7 weight %, calculated as oxide.

In certain embodiments, the catalytically-active molybdenum compound, the catalytically-active tungsten compound or the combination thereof is a molybdenum compound (i.e., no catalytically-active tungsten compound is present).

In other embodiments, the catalytically-active molybdenum compound, the catalytically-active tungsten compound or the combination thereof is a tungsten compound (i.e., no catalytically-active molybdenum compound is present).

In still other embodiments, both a catalytically-active molybdenum compound and a catalytically-active tungsten compound are present. In certain such embodiments, the ratio of catalytically-active molybdenum compound to the catalytically-active tungsten compound is at least about 1:1 (e.g., at least about 2:1, at least about 3:1, at least about 5:1, at least about 10:1). In other such embodiments, the ratio of catalytically-active molybdenum compound to the catalytically-active tungsten compound is no greater than about 1:1 (e.g., no greater than about 1:2, no greater than about 1:3, no greater than about 1:5, no greater than about 1:10). In still other such embodiments, the ratio of the ratio of catalytically-active molybdenum compound to the catalytically-active tungsten compound is in the range of about 4:1 to about 1:4 (e.g., in the range of about 3:1 to about 1:3, in the range of about 2:1 to about 1:2). All such ratios are calculated as a mole ratio of molybdenum to tungsten.

As the person of ordinary skill in the art will appreciate, the catalytically-active molybdenum compound can be provided in a variety of forms. For example, in certain embodiments, the catalytically-active molybdenum compound may be a molybdenum (VI) compound, or a molybdenum (V) compound, or a molybdenum (IV) compound. In certain embodiments, the catalytically-active molybdenum compound is provided as molybdenum oxide; for example, molybdenum (VI) oxide (e.g., $MoO_3$). Of course, the person of ordinary skill in the art will appreciate that a variety of catalytically-active molybdenum species may be present, especially after a catalyst material is sulfided for use in a sour gas shift process. And as the person of skill in the art will appreciate, the molybdenum compound can be provided as a mixture of molybdenum compounds. As used herein, weight % values of molybdenum compounds are calculated as $MoO_3$.

Similarly, the catalytically-active tungsten compound can be provided in a variety of forms. For example, the catalytically-active tungsten compound may be a tungsten (VI) compound, or a tungsten (V) compound, or a tungsten (IV) compound. In certain embodiments, the catalytically-active tungsten compound is provided as tungsten oxide; for example, tungsten (VI) oxide (e.g., $WO_3$). Of course, the person of ordinary skill in the art will appreciate that a variety of catalytically-active tungsten species may be present, especially after a catalyst material is sulfided for use in a sour gas shift process. And as the person of skill in the art will appreciate, the tungsten compound can be provided as a mixture of tungsten compounds. As used herein, weight % values of tungsten compounds are calculated as $WO_3$.

The catalyst materials described above can, in some embodiments, include one or more additional catalytically-active metal compounds. Such additional catalytically-active metal compounds can be present, for example, in a range of up to about 3 weight %, up to about 2 weight %, up to about 1 weight %, up to about 0.5 weight %, up to about 0.2 weight % or up to than about 0.1 weight %, all calculated as oxide. In certain such embodiments, the total amount of catalytically-active metal compounds (including molybdenum compounds and tungsten compounds) is present in the range of about 1 weight % to about 10 weight % (e.g., about 2 weight % to about 8 weight %, or even about 3 weight % to about 7 weight %). As described in more detail below, the additional catalytically-active metal compounds are desirably provided in amounts that do not cause the activity of the catalyst material to increase to an undesirably high level.

For example, in certain embodiments, a catalyst material as described herein further includes a catalytically-active cobalt compound, a catalytically active nickel compound, or a combination thereof. As the person of ordinary skill in the art will appreciate, the catalytically-active cobalt compound may be provided as a cobalt (II) compound, or a cobalt (III) compound, or a cobalt (II,III) compound; for example, as cobalt oxides, or cobalt molybdates. Similarly, person of ordinary skill in the art will appreciate that the catalytically-active nickel compound may also be provided as a nickel (II) compound, or a nickel (III) compound, or a nickel (II,III) compound; for example, as nickel oxide. As used herein, weight % values of cobalt compounds are calculated as CoO, and weight % values of nickel compounds are calculated as NiO.

The catalytically-active cobalt compound, the catalytically active nickel compound, or the combination thereof can be present, for example, in a range up to about 1 weight % calculated as CoO or NiO. In certain embodiments, the catalytically-active cobalt compound, the catalytically active nickel compound, or the combination thereof is present in an amount up to about 0.5 weight %, up to about 0.2 weight % or up to about 0.1 weight %.

In certain embodiments, the catalytically-active cobalt compound, the catalytically-active nickel compound or the combination thereof is a catalytically-active cobalt compound (i.e., no catalytically-active nickel compound is present).

In other embodiments, the catalytically-active cobalt compound, the catalytically-active nickel compound or the combination thereof is a catalytically-active nickel compound (i.e., no catalytically-active cobalt compound is present).

In still other embodiments, both a catalytically-active cobalt compound and a catalytically-active nickel compound are present. In certain such embodiments, the ratio of catalytically-active cobalt compound to the catalytically-active nickel compound is at least about 1:1 (e.g., at least about 2:1, at least about 3:1, at least about 5:1, at least about 10:1). In other such embodiments, the ratio of catalytically-active cobalt compound to the catalytically-active nickel compound is no greater than about 1:1 (e.g., no greater than about 1:2, no greater than about 1:3, no greater than about 1:5, no greater than about 1:10). In still other such embodiments, the ratio of the ratio of catalytically-active cobalt compound to the catalytically-active nickel compound is in the range of about 4:1 to about 1:4 (e.g., in the range of about 3:1 to about 1:3, in the range of about 2:1 to about 1:2). All such ratios are calculated as a mole ratio of cobalt to nickel.

In certain embodiments, a catalyst material as described herein includes no other catalytically-active materials other than the catalytically-active molybdenum compound, the catalytically-active tungsten compound or the combination thereof. For example, in one embodiment, the catalyst material includes only catalytically-active molybdenum species. In other embodiments, the catalyst material includes only catalytically-active tungsten species. In still other embodiments, the catalyst material includes only a combination of catalytically-active molybdenum species and catalytically-active tungsten species.

As the person of ordinary skill in the art will appreciate, metallic promoter species are often used to modify the catalytic activity of a catalytically-active compound. Accordingly, in certain embodiments of the catalyst materials as described herein, one or more metallic promoter compounds is optionally present. Such metallic promoter compounds can be present, for example, in a in a range of up to about 1.5 weight %, up to about 1 weight %, up to about 0.5 weight %, up to about 0.2 weight %, up to about 0.1 weight %, or up to about 0.05 wt %, all calculated as oxide. In certain such embodiments, the total amount of catalytically-active metal compounds (including molybdenum compounds and tungsten compounds and any other catalytically-active compounds present) together with the metallic promoter compounds is in the range of about 1 weight % to about 10 weight % (e.g., about 2 weight % to about 8 weight %, or even about 3 weight % to about 7 weight %). As described in more detail below, the metallic promoter compounds are desirably provided in amounts that do not cause the activity of the catalyst material to increase to an undesirably high level. In certain embodiments of the catalyst materials described herein, each of the one or more metallic promoter compounds is an alkali metal compound, provided, e.g., as an oxide or a carbonate.

In other embodiments of the catalyst materials described herein, no metallic promoter compound is present in the catalyst material. In certain embodiments of the catalyst materials described herein, no alkali metal promoter compound is present in the catalyst material.

As the person of ordinary skill in the art will appreciate, a wide variety of carrier materials can be used in catalyst materials described herein. For example, in certain embodiments, the carrier material includes one or more materials selected from the group consisting of aluminum oxide, silicon dioxide, magnesium oxide, manganese oxide, zinc oxide, titanium dioxide, magnesium aluminate ($MgAl_2O_4$), zirconium oxide, and mixtures thereof. In certain such embodiments, the carrier material is at least about 70 weight %, at least about 80 weight %, at least about 90 weight %, at least about 95 weight %, at least about 98 weight %, or even at least about 99 weight % of materials selected from the group consisting of aluminum oxide, silicon dioxide, magnesium oxide, manganese oxide, zinc oxide, titanium dioxide, magnesium aluminate, and mixtures thereof. In certain such embodiments, the carrier material is selected from the group consisting of aluminum oxide, silicon dioxide, magnesium oxide, manganese oxide, zinc oxide, titanium dioxide, magnesium aluminate, and mixtures thereof.

In certain embodiments, the carrier material includes one or more materials selected from the group consisting of aluminum oxide, silicon dioxide, magnesium oxide, zinc oxide, titanium dioxide, magnesium aluminate, and mixtures thereof. In certain such embodiments, the carrier material is at least about 70 weight %, at least about 80 weight %, at least about 90 weight %, at least about 95 weight %, at least about 98 weight %, or even at least about 99 weight % of materials selected from the group consisting of aluminum oxide, silicon dioxide, magnesium oxide, zinc oxide, titanium dioxide, magnesium aluminate, and mixtures thereof. In certain such embodiments, the carrier material is selected from the group consisting of aluminum oxide, silicon dioxide, magnesium oxide, zinc oxide, titanium dioxide, magnesium aluminate, and mixtures thereof.

In certain embodiments, the carrier includes one or more materials selected from the group consisting of aluminum oxide, magnesium oxide, magnesium aluminate, and mixtures thereof. In certain such embodiments, the carrier material is at least about 70 weight %, at least about 80 weight %, at least about 90 weight %, at least about 95 weight %, at least about 98 weight %, or even at least about 99 weight % of materials selected from the group consisting of aluminum oxide, magnesium oxide, magnesium aluminate, and mixtures thereof. In certain such embodiments, the carrier material is selected from the group consisting of aluminum oxide, magnesium oxide, magnesium aluminate, and mixtures thereof.

Moreover, the person of ordinary skill in the art will appreciate that other carrier materials can be adapted for use in the catalyst materials described herein, based on the description provided herein.

For example, in one embodiment of the catalyst materials as described herein, the carrier material is substantially aluminum oxide (e.g. at least about 95 weight %, at least about 98 weight %, or even at least about 99 weight % aluminum oxide). The aluminum oxide can be provided, for example, substantially as $\gamma$-$Al_2O_3$. Accordingly, in certain embodiments, the catalyst material includes aluminum oxide present in a range of about 90 weight % to about 99 weight %, and one or more of the catalytically-active metal compounds (optionally with promoters), in any combination as described herein, present in a range of about 1 weight % to about 10 weight %. In other embodiments, the catalyst material includes aluminum oxide present in a range of 92 weight % to about 98 weight %, and one or more of the catalytically-active metal compounds (optionally with promoters), in any combination as described herein, present in a range of about 2 weight % to about 8 weight %. In other embodiments, the catalyst material includes aluminum oxide present in a range of 93 weight % to about 97 weight %, and one or more of the catalytically-active metal compounds (optionally with promoters), in any combination as described herein, present in a range of about 3 weight % to about 7 weight %.

In another embodiment of the catalyst materials as described herein, the carrier material is substantially a mixture of aluminum oxide and magnesium oxide (e.g. at least about 95 weight %, at least about 98 weight %, or even at least about 99 weight % aluminum oxide and magnesium oxide). Accordingly, in certain embodiments, the catalyst material includes aluminum oxide and magnesium oxide present in a range of about 90 weight % to about 99 weight %, and one or more of the catalytically-active metal compounds (optionally with promoters), in any combination as described herein, present in a range of about 1 weight % to about 10 weight %. In other embodiments, the catalyst material includes aluminum oxide and magnesium oxide present in a range of 92 weight % to about 98 weight %, and one or more of the catalytically-active metal compounds (optionally with promoters), in any combination as described herein, present in a range of about 2 weight % to about 8 weight %. In other embodiments, the catalyst material includes aluminum oxide and magnesium oxide present in a range of 93 weight % to about 97 weight %, and one or more of the catalytically-active metal compounds (optionally with promoters), in any combination as described herein, present in a range of about 3 weight % to about 7 weight %. The aluminum oxide-magnesium oxide carrier material can be, for example, provided as mixed boehmite and MgO. The weight ratio of the aluminum oxide to the magnesium oxide can be, for example, in the range of at least about 1:1, at least about 2:1, at least about 2.5:1, at least about 3:1, at least about 3.5:1, or even at least about 4:1. For example, in certain embodiments, the weight ratio of the aluminum oxide to the magnesium oxide is in the range of about 2.5:1 to about 99:1, about 3:1 to about 95:1, about 3:1 to about 6:1, about 3:1 to about 5:1, about 3.5:1 to about 5:1, or even about 3.7:1 to about 4.5:1.

In another embodiment of the catalyst materials as described herein, the carrier material is substantially a mixture of aluminum oxide and magnesium aluminate (e.g. at least about 95 weight %, at least about 98 weight %, or even at least about 99 weight % aluminum oxide and magnesium aluminate). Accordingly, in certain embodiments, the catalyst material includes aluminum oxide and magnesium aluminate present in a range of about 90 weight % to about 99 weight %, and one or more of the catalytically-active metal compounds (optionally with promoters), in any combination as described herein, present in a range of about 1 weight % to about 10 weight %. In other embodiments, the catalyst material includes aluminum oxide and magnesium aluminate present in a range of 92 weight % to about 98 weight %, and one or more of the catalytically-active metal compounds (optionally with promoters), in any combination as described herein, present in a range of about 2 weight % to about 8 weight %. In other embodiments, the catalyst material includes aluminum oxide and magnesium aluminate present in a range of 93 weight % to about 97 weight %, and one or more of the catalytically-active metal compounds (optionally with promoters), in any combination as described herein, present in a range of about 3 weight % to about 7 weight %. The weight ratio of the aluminum oxide to the magnesium aluminate can be, for example, in the range of about 1:10 to about 10:1, about 1:5 to about 5:1, about 1:4 to about 4:1, about 1:3 to about 3.6:1, about 1:3 to about 3:1, about 1:2 to about 2:1, about 0.7:1 to about 3.6:1, about 0.7:1 to about 1.6:1, or even about 0.9:1 to about 1.5:1. For example, in one embodiment, the weight ratio of the aluminum oxide to the magnesium aluminate is about 1.2:1.

In another embodiment of the catalyst materials as described herein, the carrier material is substantially a mixture of aluminum oxide and titanium oxide (e.g. at least about 95 weight %, at least about 98 weight %, or even at least about 99 weight % aluminum oxide and titanium oxide). Accordingly, in certain embodiments, the catalyst material includes aluminum oxide and titanium oxide present in a range of about 90 weight % to about 99 weight %, and one or more of the catalytically-active metal compounds (optionally with promoters), in any combination as described herein, present in a range of about 1 weight % to about 10 weight %. In other embodiments, the catalyst material includes aluminum oxide and titanium oxide present in a range of 92 weight % to about 98 weight %, and one or more of the catalytically-active metal compounds (optionally with promoters), in any combination as described herein, present in a range of about 2 weight % to about 8 weight %. In other embodiments, the catalyst material includes aluminum oxide and titanium oxide present in a range of 93 weight to about 97 weight %, and one or more of the catalytically-active metal compounds (optionally with promoters), in any combination as described herein, present in a range of about 3 weight % to about 7 weight %. The weight ratio of the aluminum oxide to the titanium oxide can be, for example, in the range of about 1:7 to about 99:1, about 10:1 to about 99:1, about 15:1 to about 99:1, about 20:1 to about 99:1, about 1:7 to about 10:1, about 1:2 to about 8:1, about 1:1 to about 6:1, about 1.5:1 to about 5:1, about 2.5:1 to about 4:1, or even about 2.9:1 to about 3.5:1. For example, in one embodiment, the weight ratio of the aluminum oxide to the titanium oxide is about 3.2:1.

In one particular embodiment, a catalyst material as described herein consists essentially of molybdenum oxide present in the range of about 3 weight % to about 7 weight %, and a carrier material present in the range of about 93 weight % to about 97 weight %. In certain such embodiments, the molybdenum oxide is present in the range of about 4 weight % to about 5.2% percent, or about 4.3 weight % to about 4.9 weight %, or at about 4.6 weight %. In certain such embodiments, the carrier material is aluminum oxide. In other embodiments, the carrier material is a mixture of aluminum oxide and magnesium oxide, as described above (e.g., in a weight ratio of about 3.2:1). In other embodiments, the carrier material is a mixture of aluminum oxide and magnesium aluminate, as described above (e.g., in a weight ratio of about 55:45).

In another particular embodiment, a catalyst material as described herein consists essentially of molybdenum oxide present in the range of about 3 weight % to about 7 weight %, cobalt oxide present in an amount up to about 1.0 weight %, and a carrier material present in the range of about 93 weight % to about 97 weight %. In certain such embodiments, the molybdenum oxide is present in the range of about 4 weight % to about 5.2% percent, or about 4.3 weight % to about 4.9 weight %, or at about 4.6 weight %. In certain such embodiments, the carrier material is aluminum oxide. In other embodiments, the carrier material is a mixture of aluminum oxide and magnesium oxide, as described above (e.g., in a weight ratio of about 3.2:1). In other embodiments, the carrier material is a mixture of aluminum oxide and magnesium aluminate, as described above (e.g., in a weight ratio of about 55:45).

In certain embodiments of the catalyst materials as described herein, the catalyst material exhibits a test conversion of CO that is less than about 70%, less than about 60%, or even less than about 50%. The "test conversion", as used herein, refers to the conversion in a test reaction performed at 230 to 450° C. in a set of tubular reactors (i.d.=19 mm) with 20 mL whole particle loading, at 200 psi, space velocity (SV)=3000 h$^{-1}$ steam/gas=1.0, H$_2$S=1500 ppm, CO:CO$_2$:H$_2$: N$_2$=42:16:33:9. For use in the test reaction, the catalyst material is sulfided in-situ at 320° C. with H$_2$S/H$_2$ mixed gas.

As described herein, it can be undesirable to run the sour gas shift reactions at equilibrium conversion rates. Accordingly, in certain embodiments, the catalyst materials as described herein provide a conversion of CO in a sour gas shift reaction at 400° C. that is only a fraction of the equilibrium conversion level under otherwise equivalent conditions. For example, in one embodiment, a catalyst material as described herein provides a conversion of CO in a sour gas shift reaction at 400° C. that is less than 80%, less than 70%, less than 60%, or even less than 50% of the equilibrium conversion level under otherwise equivalent conditions.

The carrier material can be formed in a variety of shapes, as would be evident to the person of ordinary skill in the art. For example, in certain embodiments, the carrier material is formed into spheres, pellets, or cylinders. Of course, other shapes (e.g., plates, irregular pieces) are possible. The individual carrier material pieces can be hollow or otherwise, and can be provided with or without lobed shapes. In other embodiments, the catalyst material (and thus the carrier material) is disposed on substrate, which itself can have a shape, e.g., to provide a high surface area.

The catalyst materials described herein can be made by conventional procedures, as would be evident to the person of ordinary skill in the art. For example, techniques such as co-dipping, sequential dipping, co-impregnation and sequential impregnation can be used to add the catalytic components to a preformed carrier. In such cases, the catalytic components are added in the form of water soluble salt solutions. For example, molybdenum and tungsten species can be added in the form of ammonium molybdate and ammonium tungstate; upon calcination, these precursors yield the corresponding oxides. Cobalt and nickel species can be added, for example, in the form of ammine carbonate solutions or nitrate solutions; here, too, the corresponding oxides result upon calcination. Alternatively, the catalytic components can be added to the carrier by conventional procedures using the desired metal oxides dissolved in aqueous ammonia solution. After dipping/impregnation, the material can be dried and calcined to convert the precursor metal species to their oxide forms.

The dipping and impregnation processes can be performed in a conventional manner. For example, the impregnation can be performed with excess precursor solution, at a temperature in the range of 5° C.-35° C., for a time in excess of 10 minutes (e.g., 20-40 min).

In certain embodiments, the catalyst materials described herein can be prepared in a stepwise manner. First, the carrier material is formed (e.g., via conventional techniques) and calcined, e.g., to convert any non-oxide precursor components to their oxide forms and allow any stabilizing oxides utilized to enter the carrier material. Following the dipping or impregnation of the catalytic components onto or in the carrier material, the material is dried (e.g., at 100° C.-140° C., using box drying, belt drying, or spray drying) and a second calcination is performed, e.g., at a temperature from about 300° C. to about 600° C. (for example, 520° C.-560° C.) to convert the salts and/or ammines of the precursor components into their oxide forms. Alternatively, a single calcination step (e.g., as described above) can be used to provide both the carrier and the catalytically-active components.

The catalyst materials used herein can be shaped and formed using conventional methods. For example, extrusion and pelleting can be used to provide the catalytic materials having a desired shape. In an exemplary embodiment, the extruded material is Ø5.5 mm.

In an exemplary, non-limiting embodiment, the catalyst materials described herein is prepared by contacting a solution of (NH$_4$)$_6$Mo$_7$O$_{24}$ (154 kg) and NH$_4$OH (960 kg) in water (480 kg) with a carrier material (1000 kg) for about 10 to about 40 minutes at a temperature between about 5° C. and 35° C.; drying at a temperature between about 100° C. and 140° C.; calcinating at a temperature between about 520° C. and 560° C.; and extruding.

The catalyst materials described herein can be provided with a variety of different pore volumes, depending, e.g., on the methods used for making them and the desired end use. For example, in certain embodiments, a catalyst material as described herein has a pore volume within the range of about 0.1 to about 1.5 cm$^3$/g, or about 0.2 to about 1.5 cm$^3$/g, or about 0.3 to about 1.5 cm$^3$/g, or about 0.5 to about 0.5 cm$^3$/g, or about 0.2 to about 0.5 cm$^3$/g, or about 0.3 to about 0.5 cm$^3$/g, or about 0.4 to about 0.5 cm$^3$/g, or about 0.1 to about 1 cm$^3$/g, or about 0.2 to about 1 cm$^3$/g, or about 0.3 to about 1 cm$^3$/g, or about 0.5 to about 1 cm$^3$/g. In various embodiments, a catalyst material as described herein has a pore volume of about 0.1 cm$^3$/g, or about 0.2 cm$^3$/g, or about 0.3 cm$^3$/g, or about 0.4 cm$^3$/g, or about 0.5 cm$^3$/g, or about 1 cm$^3$/g, or about 1.5 cm$^3$/g. In particular embodiments, the catalyst material has a pore volume within the range of about 0.3 to about 0.7 cm$^3$/g. In other particular embodiments, the catalyst material has a pore volume within the range of about 0.4 to about 0.6 cm$^3$/g. In other embodiments, the catalyst material has a pore volume within the range of about 0.2 to about 0.5 cm$^3$/g. The person of ordinary skill in the art can, in view of the methods described herein, provide a desired pore volume to a catalyst material.

Similarly, the catalyst materials described herein can be provided with a variety of different surface areas, depending, e.g., on the methods used for making them and the desired end use. The surface areas are measured using the Brunauer-Emmett-Teller (BET) Surface Area method. In certain embodiments, a catalyst material as described herein has a surface area within the range of from about 10 to about 400 m$^2$/g, or about 50 to about 400 m$^2$/g, or about 70 to about 400 m$^2$/g, or about 100 to about 400 m$^2$/g, or about 200 to about 400 m$^2$/g, or about 300 to about 400 m$^2$/g, or about 10 to about 300 m$^2$/g, or about 50 to about 300 m$^2$/g, or about 70 to about 300 m$^2$/g, or about 100 to about 300 m$^2$/g, or about 200 to about 300 m$^2$/g, or about 100 to about 250 m$^2$/g, or about 10 to about 200 m$^2$/g, or about 50 to about 200 m$^2$/g, or about 70 to about 200 m$^2$/g, or about 100 to about 200 m$^2$/g. In one embodiment, a catalyst material as described herein has a surface area of about 20 to about 300 m$^2$/g. In another embodiment, a catalyst material as described herein has a surface area of about 30 to about 200 m$^2$/g. In another embodiment, a catalyst material as described herein has a surface area of about 70 to about 300 m$^2$/g. The person of ordinary skill in the art can, in view of the methods described herein, provide a desired surface area to a catalyst material.

Likewise, the catalyst materials described herein can be provided with a variety of different crush strengths, depending, e.g., on the methods used for making them and the desired end use. For example, in certain embodiments, a catalyst material as described herein has a crush strength within the range of about 45 N/cm (i.e., ~1 lb/mm) to about 222 N/cm (i.e., ~5.0 lb/mm.) For example, in certain embodiments, a catalyst material as described herein has a crush strength of at least 45 N/cm (i.e., ~1 lb/mm), or at least 67 N/cm (i.e., ~1.5 lb/mm), or at least 90 N/cm (i.e., ~2 lb/mm), or at least 134 N/cm (i.e., ~3 lb/mm), or at least 178 N/cm (i.e., ~4 lb/mm), depending on its use. In various embodiments, a catalyst material as described herein has a crush strength within the range of about 45 N/cm to about 178

N/cm, or about 45 N/cm to about 134 N/cm, or about 45 N/cm to about 90 N/cm, or about 45 N/cm to about 67 N/cm, or about 67 N/cm to about 178 N/cm, or about 67 N/cm to about 134 N/cm, or about 67 N/cm to about 90 N/cm, about 90 N/cm to about 178 N/cm, or about 90 N/cm to about 134 N/cm. The crush strength of a catalyst material is measured using ASTM D6175-03 (2008), Standard Test Method for Radial Crush Strength of Extruded Catalyst and Catalyst Carrier Particles. The person of ordinary skill in the art can, in view of the methods described herein, provide a desired crush strength to a catalyst material.

When used as a catalyst in a sour gas shift reaction as described in more detail below, the catalyst materials described herein can be sulfided to provide active catalyst material, thus at least partially converting catalytic metallic oxide compounds to sulfided species (e.g., oxysulfides and sulfide compounds). As the person of ordinary skill will appreciate, such sulfided species are catalytically-active compounds as understood in the present disclosure. The person of ordinary skill in the art can use conventional sulfidation processes to sulfide the catalyst materials described herein, thereby providing the catalyst materials in sulfided form. Catalyst materials as described herein (e.g., in which the catalytically-active species are in oxide form) can be sulfided in-situ in the shift reactor, or in a separate location (even in a separate facility). In the sulfidation process, a catalyst material is treated with a sulfur-containing gas, such as raw syngas, a mixture of hydrogen and hydrogen sulfide, a mixture of hydrogen and carbon disulfide, a mixture of hydrogen and a mercaptan, such as butyl mercaptan, or a mixture of hydrogen and thiophenic compounds, dimethylsulfides or dimethyldisulfides. Any sulfur-containing compound that can be converted to hydrogen sulfide in the presence of hydrogen can be used in the sulfidation process. In addition, carrier gases (e.g., $N_2$ and hydrocarbons) can be blended into the feed stream. The sulfidation process generally takes several hours and occurs by means of passing a hydrogen sulfide mixture, or a mixture containing other sulfur compounds that can be converted to hydrogen sulfide in the presence of hydrogen, and carrier gases, if desired, over the precursor catalyst at a conventional space velocity.

The catalyst materials described herein can be useful in performing sour gas shift reactions. Accordingly, another aspect of the invention is a method for converting carbon monoxide and steam to carbon dioxide and hydrogen, the method comprising reacting a carbon monoxide-containing feed gas with steam in contact with a catalyst as described herein. Such reaction can be performed using conventional sour gas shift reaction apparati and techniques. For example, the method can include, before contacting the catalyst material with the feed gas, sulfiding a catalyst material as described herein (e.g., in which the catalytically-active species are in oxide form) to provide the catalyst material in sulfided form.

Advantageously, the catalyst materials described herein can be used with feed gases having high concentrations of carbon monoxide, with a substantially reduced risk of temperature runaway and methanation side reaction. Accordingly, in certain embodiments of the methods as described herein, the carbon monoxide concentration in the feed gas is in the range of about 40% to about 90%, in the range of about 50% to about 90%, in the range of about 60% to about 90%, or in the range of about 50% to about 70%.

The methods described herein can be performed at a variety of pressures and temperatures. For example, in certain embodiments, the reaction temperature can remain in the range of about 200° C. to about 500° C., in the range of about 250° C. to about 450° C., or even in the range of about 290° C. to about 400° C. In certain embodiments, the pressure of the feed gas is in the range of about 0.1 MPa to about 12 MPa, about 4 MPa to about 12 MPa, about 0.1 MPa to about 10 MPa, or about 4 to about 10 MPa. Of course, the person of ordinary skill in the art will understand that in certain embodiments and applications the temperatures and pressures may differ from those particularly described here.

The methods described herein can be performed at a wide variety of steam/gas ratios. For example, in one embodiment of the methods as described herein, the steam/gas ratio is in the range of about 0.1 to about 2.5 (vol/vol). In certain embodiments. of the methods as described herein, the steam/gas ratio is in the range of about 0.2 to about 1.8; about 0.2 to about 2.5, or about 0.1 to about 1.8. Of course, the person of ordinary skill in the art will understand that in certain embodiments and applications the steam/gas ratio may differ from the ratios particularly described here.

Sour gas shift reactions are generally performed with feed gases that include sulfur species. For example, in one embodiment of the methods as described herein, the feed gas includes one or more sulfur species present in an amount in the range of about 100 ppm-about 5%. In certain embodiments of the methods as described herein, the feed gas includes one or more sulfur species present in an amount in the range of about 100 ppm-about 2%, about 300 ppm-about 2%, or about 300 ppm-about 5%. Of course, the person of ordinary skill in the art will understand that in certain embodiments and applications the amount of sulfur species may differ from the amounts particularly described here.

As described herein, it can be undesirable to run the sour gas shift reactions at equilibrium conversion rates. Accordingly, in certain embodiments, the methods as described herein are performed at a conversion that is only a fraction of the equilibrium conversion level. For example, in one embodiment, in a method as described herein the reaction of the carbon monoxide-containing feed gas with steam in contact with the catalyst material is performed at a conversion that is less than 80%, less than 70%, less than 60%, or even less than 50% of the equilibrium conversion level under the reaction conditions. The person of ordinary skill in the art, in view of the present disclosure, will select catalyst material composition and activity and reaction conditions to provide the desired kinetically-limited operation.

The person of ordinary skill in the art will appreciate that the feed gas can come from a variety of sources. For example, the feed gas can come from a gasification process, as is well known in the art. The feed gas can come from, for example, the gasification of coal, heavy residues, biomass, waste and other carbon-rich feedstocks.

EXAMPLES

The catalyst materials and methods of the disclosure are illustrated further by the following examples, which are not to be construed as limiting the disclosure in scope or spirit to the specific procedures and in them.

Example 1

Comparative

Commercially available SM 820® was used to present the industrially utilized CoMo catalyst (sample-1).

Example 2

Comparative 527 g of $Al_2O_3.H_2O$ was premixed with 357 g of $Mg(OH)_2$ and 158 g of $TiO_2$ in 2000 mL deionized water; ammonia was then added to provide a pH of 8. The slurry was agitated for 30 min, then the solids were collected by filtration to provide a filter cake. 129 g of $(NH_4)_6Mo_7O_{24}\cdot 4H_2O$ and 163 g of $Co(NO_3)_2\cdot 6H_2O$ were dissolved in 1200 mL deionized water. This Co/Mo solution was added to the filter cake. The ingredients were mixed and slurried for 15 min, then dried slowly to remove the water. The dried material was thermally treated at 500° C. before formed by extrusion (Ø4 mm). The composition of this sample corresponds to sample D of U.S. Pat. No. 6,019,954 (sample-2).

Example 3

4.3 g of $(NH_4)_6Mo_7O_{24}\cdot 4H_2O$ was dissolved in 75 mL of 16% $NH_4OH$ solution. 50 g of alumina carrier (prepared via extrusion) was soaked in the solution for 30 min, then the solution was drained away from the alumina. The dipped extrusion was dried at 110° C. followed by calcination at 450° C. (sample-3).

Example 4

The sample was prepared by the process of Example 3, except 6.6 g of $(NH_4)_6Mo_7O_{24}\cdot 4H_2O$ dissolved in 75 mL of 16% $NH_4OH$ solution was used (sample-4).

Example 5

The sample was prepared by the process of Example 3, except 11.5 g of $(NH_4)_6Mo_7O_{24}\cdot 4H_2O$ dissolved in 75 mL of 16% $NH_4OH$ solution was used (sample-5).

Example 6

The sample was prepared by the process of Example 3, except 19.1 g of $(NH_4)_6Mo_7O_{24}\cdot 4H_2O$ dissolved in 75 mL of 16% $NH_4OH$ solution (sample-6) was used.

Example 7

100 g of alumina and 82 g of magnesium aluminate ($MgAl_2O_4$) were mixed. The mixture was formed into a carrier material by extrusion followed by drying and calcination. 6.2 g of $(NH_4)_6Mo_7O_{24}\cdot 4H_2O$ was dissolved in 75 mL of 20% $NH_4OH$ solution. Then 50 g of the carrier material was soaked in the solution for 30 min, followed by draining the solution out. The dipped extrusion was dried at 110° C. followed by calcination at 450° C. (sample-7).

Example 8

The sample was prepared by the process of Example 7, except 12.3 g of $(NH_4)_6Mo_7O_{24}\cdot 4H_2O$ dissolved in 68 mL of 16% $NH_4OH$ solution (sample-8).

Example 9

300 g of alumina was mixed thoroughly with 50 g of $TiO_2$ powder. The mixture was formed into a carrier by pelleting followed by drying and calcination. 7.4 g of $(NH_4)_6Mo_7O_{24}\cdot 4H_2O$ was dissolved in 48 mL of 20% $NH_4OH$ solution. Then 40 g of the carrier material was soaked in the solution for 30 min. After the solution was drained away, the dipped pellets were dried at 110° C. followed by calcination at 450° C. (sample-9).

Example 10

169 g of alumina and 50 g of $La_2O_3$ powder were mixed thoroughly. The mixture was formed into a carrier material by pelleting followed by drying and calcination. 7.3 g of $(NH_4)_6Mo_7O_{24}\cdot 4H_2O$ was dissolved in 48 mL of 20% $NH_4OH$ solution. Then 40 g of the carrier material was soaked in the solution for 30 min. After the solution was drained away, the dipped pellets were dried at 110° C. followed by calcination at 450° C. (sample-10).

Example 11

179 g of alumina and 37 g of ZnO powder were mixed thoroughly. The mixture was formed into a carrier material by pelleting followed by drying and calcination. 7.1 g of $(NH_4)_6Mo_7O_{24}\cdot 4H_2O$ was dissolved in 48 mL of 20% $NH_4OH$ solution. Then 40 g of carrier was soaked in the solution for 30 min. After the solution was drained away, the dipped pellets were dried at 110° C. followed by calcination at 450° C. (sample-11).

Example 12

300 g of alumina and 90 g of magnesium oxide were mixed. The mixture was formed into a carrier material by extrusion followed by drying and calcination. 15.9 g of $(NH_4)_6Mo_7O_{24}\cdot 4H_2O$ was dissolved in 68 mL of 16% $NH_4OH$ solution. Then 40 g of carrier was soaked in the solution for 30 min. After the solution was drained away, the dipped extrusion was dried at 110° C. followed by calcination at 450° C. (sample-12).

Example 13

The sample was prepared by the process of Example 12, except 6.08 g of $(NH_4)_6Mo_7O_{24}\cdot 4H_2O$ dissolved in 68 mL of 16% $NH_4OH$ solution was used (sample-13).

Example 14

The sample was prepared by the process of Example 12, except 8.7 g of $(NH_4)_6Mo_7O_{24}\cdot 4H_2O$ and 3.4 g of $Co(NO_3)_2$ dissolved in 48 mL of 20% $NH_4OH$ solution was used (sample-14).

Example 15

The sample was prepared by the process of Example 12, except 2.0 g of $(NH_4)_6Mo_7O_{24}\cdot 4H_2O$ and 3.2 g of $Co(NO_3)_2$ dissolved in 48 mL of 20% $NH_4OH$ solution was used (sample-15).

Example 16

The sample was prepared by the process of Example 12, except 4.52 g of $(NH_4)_6Mo_7O_{24}\cdot 4H_2O$ and 2.02 g of $Co(NO_3)_2$ dissolved in 48 mL of 20% $NH_4OH$ solution was used (sample-16).

Example 17

The sample was prepared by the process of Example 12, except 7.8 g of $(NH_4)_6Mo_7O_{24}\cdot 4H_2O$ and 0.4 g of $Co(NO_3)_2$ dissolved in 48 mL of 20% $NH_4OH$ solution was used (sample-17).

In Examples 18-21, samples made in Examples 1-17 were tested in lab-scale CO shift reactions at different reaction conditions in a set of tubular reactors (i.d.=19 mm) with 20 mL whole particle loading. All samples were sulfided in-situ at 320° C. with $H_2S/H_2$ mixed gas before sour gas shift process.

Example 18

Test 1 was performed at 200 psi, steam/gas=1.0, $H_2S$=1500 ppm, $CO:CO_2:H_2:N_2$=42:16:33:9. The results are shown in Table 1.

TABLE 1

| Sample No. | Catalyst composition, weight % | | | | | CO conversion, % | | |
|---|---|---|---|---|---|---|---|---|
| | $Al_2O_3$ | MgO | $TiO_2$ | $MoO_3$ | CoO | 300° C. | 375° C. | 450° C. |
| 1 | SM 820 ® | | | | | 80.6 | 84.5 | 79.3 |
| 2 | 45.1 | 24.7 | 16.0 | 10.2 | 4.0 | 74.1 | 83.1 | 79.2 |
| 3 | 96.7 | | | 3.3 | | 15.5 | 33.8 | 54.6 |
| 4 | 95.4 | | | 4.6 | | 20.9 | 36.5 | 58.2 |
| 5 | 92.4 | | | 7.6 | | 23.4 | 42.1 | 65.5 |
| 6 | 87.9 | | | 12.1 | | 31.8 | 48.2 | 76.8 |

The test results in Table 1 demonstrate that CO conversion at 375° C. approached equilibrium conversion over the commercial SM 820® catalyst material (sample-1) and the prior art sample-2 catalyst material. The catalyst material having 12.1% $MoO_3$ on $Al_2O_3$ (sample-6) showed CO conversion closing to equilibrium conversion at 450° C. Samples-2, -3, -4 and -5, in contrast, provided kinetically limited activity. In industrial reactors, when the catalyst provides activity approaching equilibrium conversion, the bottom bed temperature will be higher with higher concentrations of CO in the feedstock. Such high temperatures on the catalyst bed can deactivate the catalyst more quickly and produce more by-products and thus can result in disadvantages in operation. Accordingly, kinetically-limited operation can in certain embodiments be advantageous.

Example 19

Test 2 was performed at 200 psi, steam/gas=1.0, $H_2S$=1500 ppm, $CO:CO_2:H_2:N_2$=53:12:31:4. The results are shown in Tables 2 and 3.

TABLE 2

| Sample No. | Catalyst composition, weight % | | | | | | CO conversion, % | | |
|---|---|---|---|---|---|---|---|---|---|
| | $Al_2O_3$ | MgO | $MgAl_2O_4$ | $TiO_2$ | $MoO_3$ | CoO | 300° C. | 375° C. | 450° C. |
| 1 | SM 820 ® | | | | | | 69.8 | 82.5 | 78.8 |
| 2 | 45.1 | 24.7 | | 16.0 | 10.2 | 4.0 | 63.9 | 81.3 | 78.4 |
| 4 | 95.4 | | | | 4.6 | | 18.9 | 34.3 | 52.5 |
| 7 | 52.5 | | 43.1 | | 4.4 | | 20.8 | 43.4 | 61.2 |
| 8 | 50.8 | | 41.7 | | 7.5 | | 25.2 | 52.1 | 70.5 |
| 9 | 72.1 | | | 23.1 | 4.8 | | 17.9 | 39.5 | 65.4 |
| 10 | 72.3 | | | 23.2 | 4.5 | | 15.5 | 42.1 | 70.9 |
| 11 | 71.9 | | | 23.1 | 5.0 | | 15.2 | 38.2 | 62.3 |
| 12 | 76.7 | 18.6 | | | 4.7 | | 20.1 | 43.0 | 69.5 |
| 13 | 70.7 | 17.2 | | | 12.1 | | 28.8 | 54.5 | 78.1 |
| 14 | 77.9 | 19.0 | | | 2.1 | 1.0 | 40.5 | 60.2 | 75.2 |
| 15 | 73.2 | 17.8 | | | 8.0 | 1.0 | 55.2 | 77.0 | 78.9 |
| 16 | 76.1 | 18.5 | | | 4.8 | 0.6 | 30.1 | 52.8 | 72.9 |
| 17 | 74.2 | 18.0 | | | 7.7 | 0.1 | 26.2 | 52.6 | 72.5 |

The test results in Table 2 demonstrate that CO conversion at 375° C. approached equilibrium conversion over the commercial SM 820® catalyst material (sample-1) and the prior art sample-2 catalyst material. The catalyst with 12.1 weight % $MoO_3$ on $Al_2O_3$/MgO (sample-13) demonstrated CO conversion approaching equilibrium conversion at 450° C. Samples-4, -7, -8, -9, -10, -11 and -12 provided kinetically limited activity.

When 1.0 weight % cobalt (II) oxide was included with the 8.0 weight % molybdenum (VI) oxide on the aluminum oxide/magnesium oxide carrier material (sample-15), CO conversion approached equilibrium at 450° C. For a catalyst material with 1.0% cobalt (II) oxide and 2.1% molybdenum (VI) oxide on a similar carrier (sample-14) under similar reaction conditions, CO conversion is limited kinetically; however, the material had poor stability. As shown by samples-16 and 17, a relatively small amount of cobalt (II) oxide (e.g., less than 1.0 weight %, less than 0.85 weight %, or even less than 0.7 weight %) in combination with molybdenum (VI) oxide (e.g., less than 8 weight %, less than 7 weight %, even less than about 6 weight %) can provide kinetically-limited CO conversion.

TABLE 3

| Sample No. | Reaction condition | | | CO conversion, % | | |
|---|---|---|---|---|---|---|
| | DGSV, $h^{-1}$ | Pressure, psi | Steam/gas, mol/mol | 230° C. | 335° C. | 422° C. |
| 1 | 3000 | 200 | 1.0 | 41.4 | 80.2 | 81.1 |
| | 3000 | 400 | 1.0 | 71.2 | 85.1 | 82.4 |
| | 6000 | 400 | 1.0 | 60.5 | 80.2 | 80.5 |
| 4 | 3000 | 200 | 1.0 | 5.2 | 20.2 | 40.5 |
| | 3000 | 400 | 1.0 | 17.9 | 39.5 | 65.4 |
| | 6000 | 400 | 1.0 | 15.5 | 42.1 | 70.9 |

Table 3 demonstrates that CO conversion approached equilibrium even at a temperature as low 335° C. over sample-1 (commercial catalyst) at different space velocities and pressures, while sample-4 exhibited kinetically limited activity under all conditions. In industrial reactors, when the catalyst provides activity approaching equilibrium conversion, the bottom bed temperature will be significant higher with CO concentrations higher than 50% in the feedstock. Under such conditions, the reactor temperature may be in excess of 510° C. over a catalyst approaching equilibrium conversion, which can be unsuitable due to the high deactivation rate of the catalyst and the risk for temperature run-away of the methanation reaction.

Example 20

Test-3 was performed with $CO:CO_2:H_2:N_2=68:10:19.5:2.5$, $H_2S=1000$ ppm. The results are shown in Table 4.

TABLE 4

| Sample No. | Steam/gas mol/mol | CO conversion, % | | | | |
|---|---|---|---|---|---|---|
| | | 200° C. | 250° C. | 350° C. | 400° C. | 450° C. |
| 1 | 1.0 | 40.1 | 48.5 | 62.5 | 66.6 | 66.2 |
| | 0.5 | 25.8 | 35.2 | 48.3 | 50.5 | 48.3 |
| | 0.2 | 9.6 | 18 | 25 | 26.2 | 24.6 |
| 12 | 1.0 | 8 | 15 | 31 | 50 | 54 |
| | 0.5 | 5.6 | 10 | 20 | 35 | 40 |
| | 0.2 | 3.8 | 6 | 12 | 17 | 21.6 |

The test results in Table 4 demonstrate that CO conversion approached equilibrium conversion over the commercial catalyst (sample-1) at a variety of different steam/gas ratios, while sample-12 provided kinetically limited activity. In industrial reactors, when the catalyst is active enough to approach equilibrium conversion, the bottom bed temperature will be undesirably high with CO % at 68% in the feedstock.

Example 21

Simulation with software indicated that at steam/gas ratio of 0.6 with 68% CO in the feed, temperature of a reactor with sample-1 (commercial catalyst) will run up to >600° C., which is generally unsuitable for industrial processes. With sample-12, temperature of the reactor will run only up to 400° C., which provides for improvements in the CO shift reaction, minimizes side reactions (e.g., methanation) and provides for improved catalyst stability. Moreover, the sour gas shift process can more easily be operated/controlled.

Example 22

The effect of thermal treatment of the aluminum oxide carrier material on catalytic activity was investigated. The aluminum oxide carrier material was calcined at temperatures ranging from 550° C. to 950° C., then impregnated with molybdenum (VI) oxide at 10.7 weight %. The surface area of the carrier material decreased from 200 m²/g (550° C.) to 100 m²/g (950° C.). The pore volume did not change significantly (about 0.56 cm³/g). The crystalline phase did not change ($\gamma$-$Al_2O_3$).

The activities of the catalyst materials at various reaction temperatures are shown in FIG. 1. The experiments were performed with $CO:CO_2:H_2:N_2=40:17:34:9$, steam/CO=2.5, steam/gas=1.0, $H_2S=1000$ ppm. The activity of the catalyst materials decreased somewhat with increasing carrier calcination temperature, but the magnitude of the decrease is limited, as shown in FIG. 1. Activity of the catalyst with 10.7 weight % molybdenum (VI) oxide loaded on the carrier decreased gradually with the carrier calcined at high temperatures. However, the change magnitude is limited.

Example 23

Figure 2:
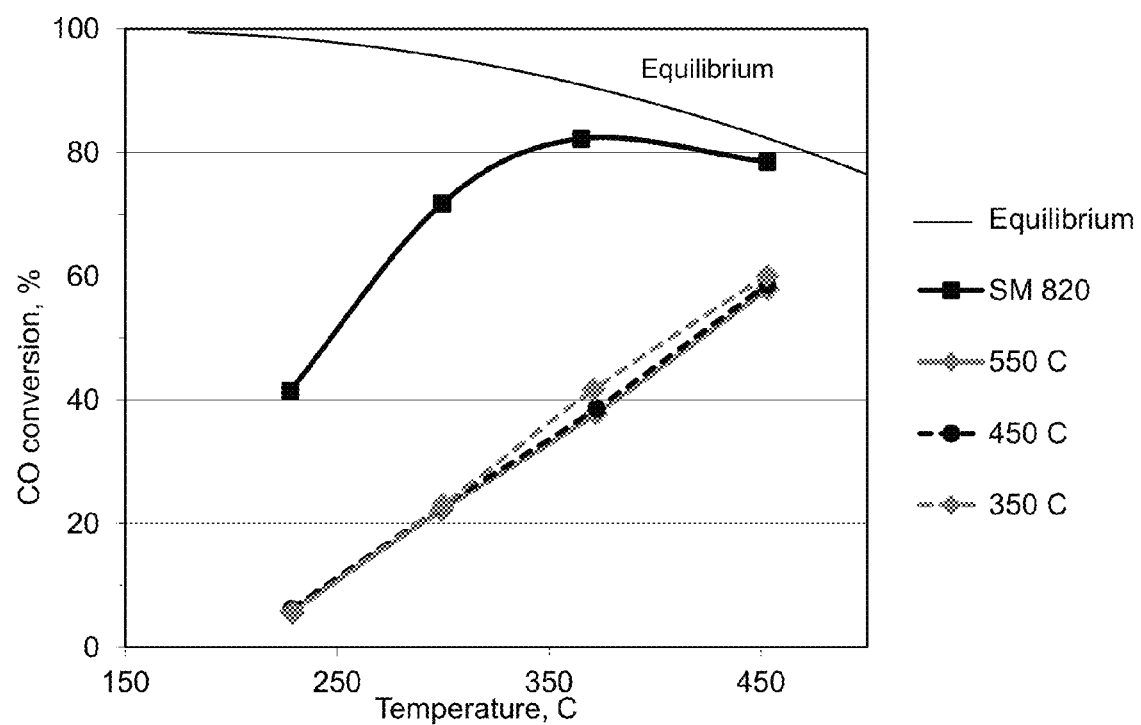
FIG. 2 is a graph depicting the results of an investigation of the effect of calcination temperature of a molybdenum (VI) oxide catalyst material on catalytic activity.

The effect of calcination temperature of a molybdenum (VI) oxide catalyst material on catalytic activity was investigated for a catalyst material containing 7.7 weight % molybdenum (VI) oxide on aluminum oxide. The experiments were performed otherwise as described above with respect to Example 22. The results are shown in FIG. 2. Calcination temperatures ranging from 350° C. to 550° C. had only minimal effects on activity.

Example 24

Figure 3:
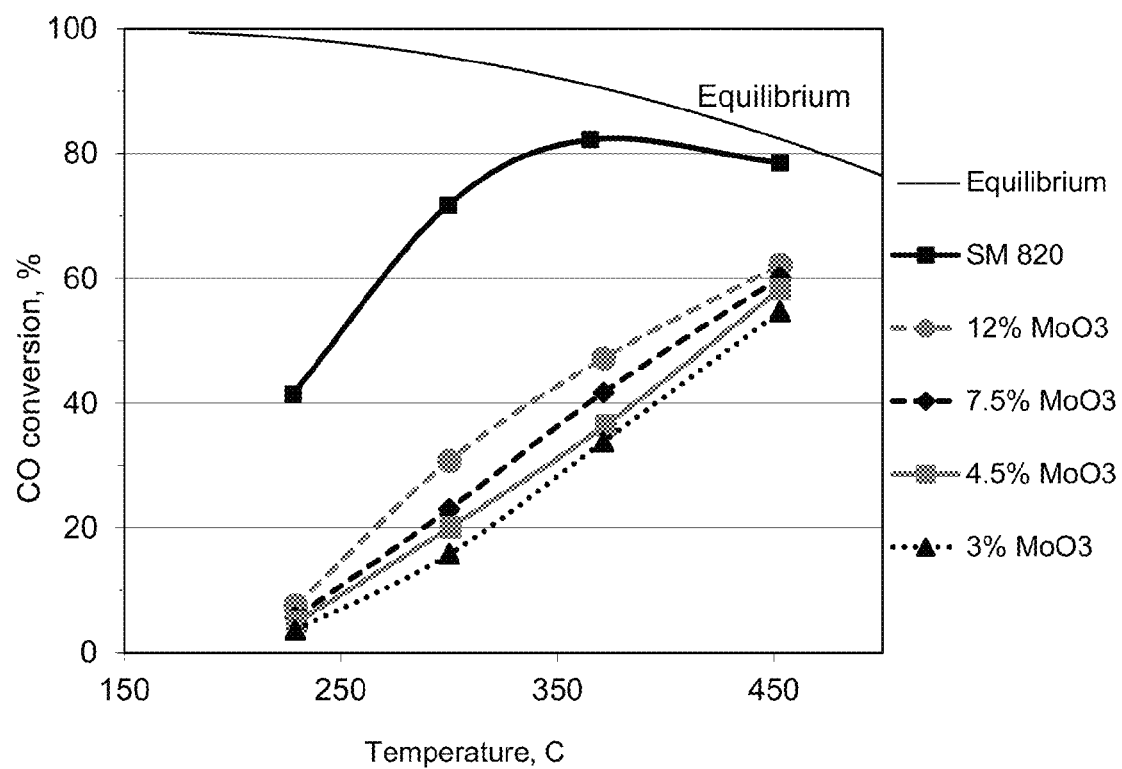
FIG. 3 is a graph depicting the results of an investigation of molybdenum (VI) oxide concentration on catalytic activity.

The effect of molybdenum (VI) oxide concentration on catalyst activity was investigated for catalyst materials containing molybdenum (VI) oxide on aluminum oxide. The experiments were performed otherwise as described above with respect to Example 22. The results are shown in FIG. 3. The carrier material alone did not exhibit any activity at low temperatures; at 450 C, roughly 5% conversion was achieved (results not shown). Addition of a small amount of molybdenum (VI) oxide increased activity significantly, with increasing molybdenum (VI) oxide providing increasing activity.

Example 25

Figure 4:
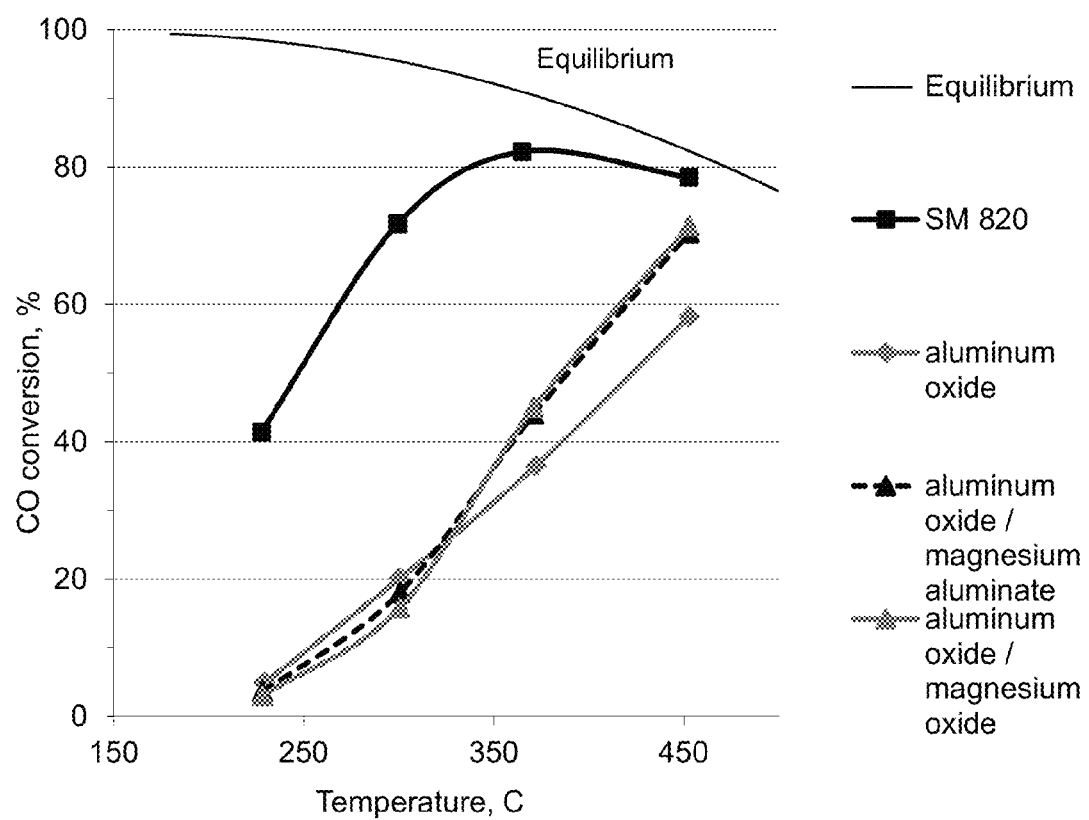
FIG. 4 is a graph depicting the results of an investigation of the effect of effect of magnesium contained in the carrier material on catalytic activity.

The effect of magnesium content in the carrier material on catalyst activity was investigated for catalyst materials containing molybdenum (VI) oxide at 4.6 weight %. The experiments were performed otherwise as described above with respect to Example 22. The results are shown in FIG. 4. At low temperatures, the performance was similar for aluminum oxide, aluminum oxide/magnesium aluminate (55:45) and aluminum oxide/magnesium oxide (76:24) carrier materials. At higher temperatures, the catalyst materials with magnesium-containing carrier materials exhibited increased activity.

Example 26

Figure 5:
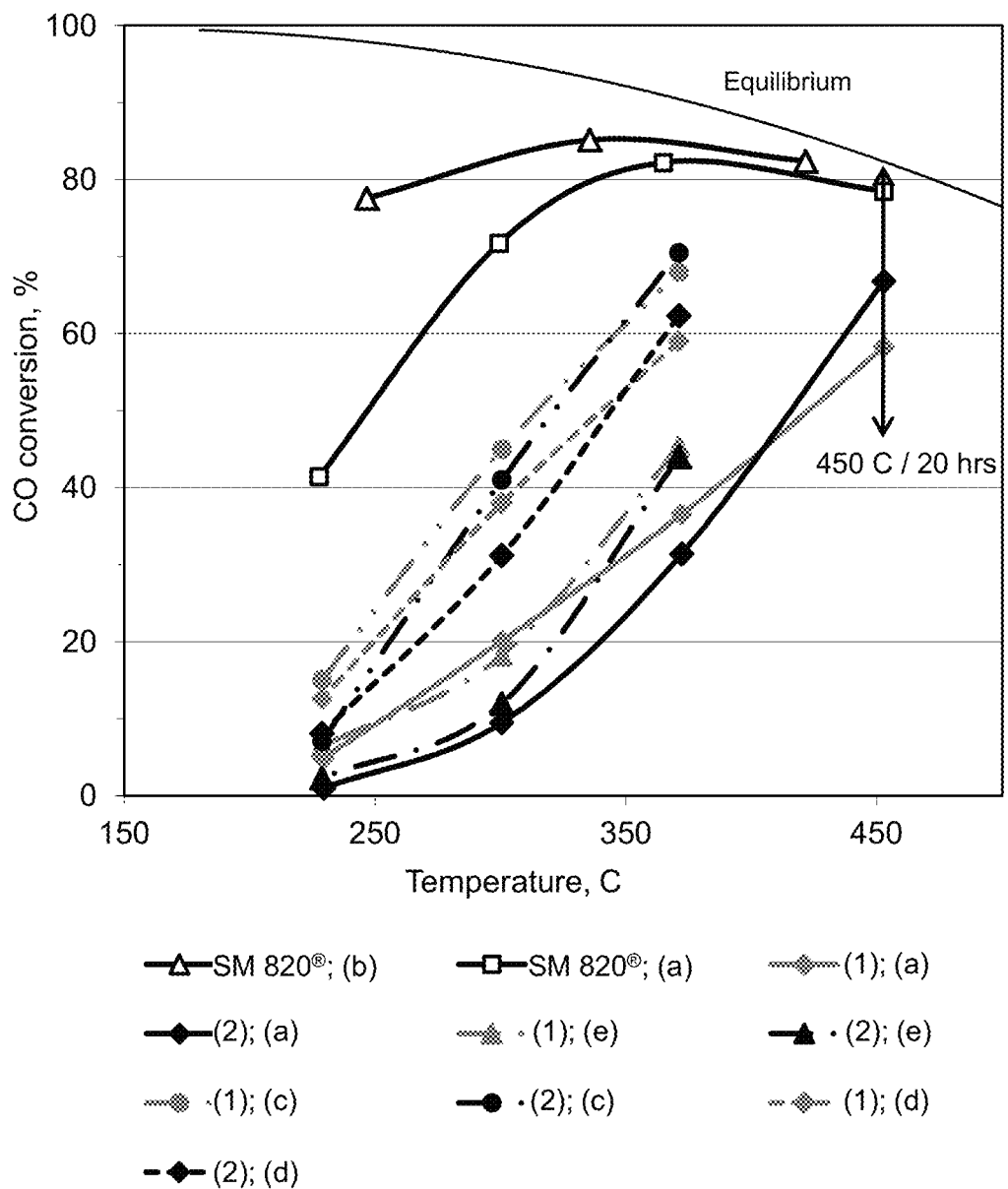
FIG. 5 is a graph depicting the results of an investigation of the effect of various combinations of pressure, steam/gas ratio and space velocity of the sour gas shift reaction on catalytic activity.

The effect of various combinations of pressure, steam/gas ratio and space velocity of the sour gas shift reaction on catalytic activity was investigated for catalyst materials containing molybdenum (VI) oxide at 4.6 weight %, on aluminum oxide and on aluminum oxide/magnesium aluminate (55:45). As is evident from the results in FIG. 5, the catalyst materials described herein can be used under a variety of conditions.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A catalyst material for use in a kinetically-controlled sour gas shift reaction, the catalyst material comprising:
   a carrier material; and
   a catalytically-active molybdenum compound, a catalytically-active tungsten compound, or a combination thereof, disposed on the carrier material, present in the range of about 2 weight % to about 8 weight % based on the total weight of the catalyst material;
   wherein any additional catalytically-active metal compounds that are present are present in a total amount less than about 1 weight % based on the total weight of the catalyst material;
   wherein the amount of any catalytically-active molybdenum compound is calculated as $MoO_3$, wherein the amount of any catalytically-active tungsten compound is calculated as $WO_3$, and wherein the amounts of any additional catalytically-active metal compounds are calculated as oxide;

wherein catalytically-active refers to catalytic activity in a sour gas shift reaction; and wherein the catalyst material is in sulfided form, such that at least part of the catalytically-active metal compounds are in the form of sulfided species, and wherein the catalyst material exhibits a test conversion of CO that is less than about 60% at 375° C., wherein the test conversion is performed in a set of tubular reactors (i.d.=19 mm) with 20 mL whole particle loading, at 200 psi, space velocity (SV)=3000 $h^{-1}$, steam/gas=1.0, $H_2S$=1500 ppm, $CO:CO_2:H_2:N_2$=42:16:33:9, and wherein the test conversion is performed on the catalyst material after it has been sulfided in-situ at 320° C. with $H_2S/H_2$ mixed gas.

2. A catalyst material of claim 1, wherein the catalytically active molybdenum compound, the catalytically-active tungsten compound, or the combination thereof is present in the range from about 3 weight % to about 7 weight % based on the total weight of the catalyst material.

3. A catalyst material of claim 1, comprising a catalytically-active molybdenum compound.

4. A catalyst material of claim 1, comprising the one or more additional catalytically-active metal compounds.

5. A catalyst material of claim 1, further comprising a catalytically-active cobalt compound, a catalytically active nickel compound, or a combination thereof, present in the range of less than about 1 weight % based on the total weight of the catalyst material, wherein the amount of any catalytically-active cobalt compound is calculated as CoO, and wherein the amount of any catalytically-active nickel compound is calculated as NiO.

6. A catalyst material of claim 1, wherein the catalyst material includes no catalytically-active metal compound other than the catalytically-active molybdenum compound, the catalytically-active tungsten compound, or the combination thereof.

7. A catalyst material of any claim 1, wherein the catalyst material includes no catalytically-active metal compound other than the catalytically-active molybdenum compound.

8. A catalyst material of claim 1, wherein the catalyst material does not include a metallic promoter compound.

9. A catalyst material of claim 1, wherein the catalyst material does not include an alkali metal promoter compound.

10. A catalyst material of claim 1, wherein the carrier material is selected from the group consisting of: aluminum oxide, silicon dioxide, magnesium oxide, manganese oxide, zinc oxide, titanium oxide, magnesium aluminate, zirconium oxide, and mixtures thereof.

11. A catalyst material of claim 1, wherein the carrier material is aluminum oxide, magnesium oxide, magnesium aluminate, or a mixture thereof.

12. A catalyst material of claim 1, consisting essentially of sulfided molybdenum oxide present in the range of about 3 weight % to about 7 weight %, and a carrier material present in the range of about 93 weight % to about 97 weight %, based on the total weight of the catalyst material.

13. A catalyst material of claim 1, consisting essentially of sulfided molybdenum oxide present in the range of about 3 weight % to about 7 weight %, sulfided cobalt oxide present in an amount less than about 1 weight %, and a carrier material present in the range of about 93 weight % to about 97 weight %, based on the total weight of the catalyst material.

14. A catalyst material according to claim 1, exhibiting a test conversion of CO that is less than about 50% at 375° C.

15. A catalyst material according to claim 1, exhibiting a conversion of CO in a sour gas shift reaction performed under a set of conditions comprising a 400° C. reaction temperature that is less than 60% of the equilibrium conversion level under the set of conditions.

16. A catalyst material according to claim 1, wherein the carrier comprises aluminum oxide and titanium oxide.

17. A catalyst material according to claim 1, wherein any additional catalytically-active metal compounds that are present are present in a total amount less than about 0.5 weight % based on the total weight of the catalyst material.

18. A catalyst material of claim 1, further comprising a catalytically-active cobalt compound, a catalytically active nickel compound, or a combination thereof, present in the range of less than about 0.5 weight % based on the total weight of the catalyst material, wherein the amount of any catalytically-active cobalt compound is calculated as CoO, and wherein the amount of any catalytically-active nickel compound is calculated as NiO.

* * * * *